(12) United States Patent
Hodges et al.

(10) Patent No.: US 12,368,516 B2
(45) Date of Patent: Jul. 22, 2025

(54) QUANTUM PROBABILITY ENCODING FOR PATH IDENTIFICATION, QUANTUM RELAYS AND FASTER DATA RATES

(71) Applicant: General Dynamics Mission Systems, Inc., Fairfax, VA (US)

(72) Inventors: Todd Hodges, Fairfax, VA (US); Glen Uehara, Fairfax, VA (US); Jacob Glasby, Fairfax, VA (US)

(73) Assignee: General Dynamics Mission Systems, Inc., Fairfax, VA (US)

( * ) Notice: Subject to any disclaimer, the term of this patent is extended or adjusted under 35 U.S.C. 154(b) by 293 days.

(21) Appl. No.: 18/296,513

(22) Filed: Apr. 6, 2023

(65) Prior Publication Data

US 2024/0340090 A1 Oct. 10, 2024

(51) Int. Cl.
*H04B 10/00* (2013.01)
*H04B 10/29* (2013.01)
*H04B 10/70* (2013.01)
*H04J 14/02* (2006.01)
*H04J 14/00* (2006.01)

(52) U.S. Cl.
CPC ............. *H04B 10/70* (2013.01); *H04B 10/29* (2013.01); *H04J 14/02* (2013.01)

(58) Field of Classification Search
CPC ...................................................... H04B 10/70
See application file for complete search history.

(56) References Cited

U.S. PATENT DOCUMENTS

2014/0099104 A1* 4/2014 Peters ............... H04B 10/2507
398/25
2020/0409232 A1* 12/2020 Weiner .................. G06N 10/20

* cited by examiner

Primary Examiner — Daniel G Dobson
(74) Attorney, Agent, or Firm — Lorenz & Kopf, LLP

(57) ABSTRACT

The quantum relay and quantum signal source exploit quantum properties of photon streams. A pair of spatially separated and polarization-entangled photon streams is used. The pair collectively exist in a quantum superposition state by virtue of their mutual entanglement. In the relay, an encoder establishes a modulation control signal corresponding to the information to be conveyed. An optical quantum circuit is placed in the path of one of the pair of streams, so that the first stream passes through it. The optical quantum circuit alters the quantum polarization state of the photon passing through it based on the control signal. In this way information is encoded into quantum probability distributions of the superposition state through quantum parallelism and quantum interference, whereby information is conveyed in the photon streams. In the signal source a second information source is used to modulate the other of the pair of streams, thus enhancing the information density of the system, by encoding both in the probability distribution and in the correlation of the photon arrival times.

15 Claims, 6 Drawing Sheets

QUANTUM PROBABILITY ENCODING FOR PATH IDENTIFICATION, QUANTUM RELAYS AND FASTER DATA RATES

TECHNICAL FIELD

This disclosure relates generally to communication systems and more particularly to a quantum probability encoding technique that allows messages to be quantum-encoded in and carried by a propagating stream of entangled photons.

BACKGROUND

This section provides background information related to the present disclosure which is not necessarily prior art.

Communication systems today rely heavily on digital modes and computer networking. In classical digital information systems, binary digits are used to represent the digital data. Ultimately these binary digits are represented by the electrical charge state of a nano-scale transistors embodied in silicon. In such classical systems the binary digits correspond to the on-off state of switches, implemented by transistor logic circuits. In these classical systems the binary digits have only two valid states: on or off, and thus can express only two values 1 or 0, in the alternative.

There has been considerable interest in quantum computing and quantum communication, yet there are numerous technological hurdles. Quantum digits, called qubits, can express many more states than simply on or off. In theory, quantum computers should be able to solve some problems better than classical systems. However, implementing such systems has proven to be quite challenging. Similarly, quantum techniques for conveying information could prove very useful. However, today quantum communication systems are lacking many of the fundamental tools needed to make this possible.

Communication System Devices

A fundamental purpose of most communication systems is to convey information from source to destination. If the source and destination are in line-of-sight with one another, and close enough so that the signal from the source reaches the destination with sufficient strength to be read, then usually no special extra equipment is required. However, if the line-of-sight path between source and destination is blocked or interfered with, a relay device, or series of relay devices, can be used to route the signal around the blockage. Such a relay system effectively redirects the signal so that it follows a different path which bypasses the blockage or interference.

In some communication systems, such as those employing a network of nodes, it may be necessary to boost the signal as it propagates from one node to the next. A repeater device is used for this purpose. The repeater device receives the incoming signal, extracts the information from that signal, and then generates a new signal with the same information to overcome the power loss up to that point in the chain.

Relays and repeaters are common in classical communication systems. Such systems use a propagating electromagnetic wave that is modulated to carry information according to a chosen modulation scheme.

The situation is quite different when the communication system uses quantum techniques to convey information. Quantum systems rely on entangled particles, such as entangled photons, to convey information. Great care must be taken in order to preserve the state of entanglement. Relay and repeater systems used by classical communication systems are inadequate in this regard. Thus, new technology for implementing relays and repeaters is needed.

SUMMARY

Disclosed here is a quantum communication technology that exploits quantum parallelization and interference properties of polarization-entangled photons. The disclosed quantum communication system can be used to send messages that have been encoded in the probability states of the entangled photons. The system encodes in both the probability distribution and the correlation of the photon arrival times In addition, the disclosed system provides new technology that gives more flexibility when implementing optical quantum circuits that will not destroy the entangled state. A quantum relay device implementing the disclosed technology can add additional information, such as a link-identifying quantum signature to the message. A quantum signal source using both the probability distribution of the observables and the correlated photon arrival times simultaneously produces greater information density and faster data rates than what can be achieved by a purely classical communication system.

According to a first aspect of the disclosed technology, a quantum relay exploits quantum properties to encode information in a received hyper-entangled photon stream which has been entangled with respect to wavelength (time-energy entanglement) and polarization. A first wavelength division multiplexer separates the constituent photons of the hyper-entangled pairs into spatially distinct streams based on photon wavelength.

An automatically controlled half-wave plate is positioned to operate on the first entangled stream by altering its polarization based on information to be encoded, thereby producing an altered first entangled stream. The altered first entangled stream and the second entangled stream collectively exist in a quantum superposition state by virtue of their mutual polarization entanglement.

The altered first entangled stream and the second entangled stream are fed to the pair of inputs of the second wavelength division multiplexer. The second wavelength division multiplexer combines the altered first entangled stream and the second entangled stream into an output stream supplied to the output of the second wavelength division multiplexer, whereby the output stream carries encoded information in the quantum probability distributions of the quantum superposition state.

According to another aspect of the disclosed technology a quantum signal source produces a plurality of photon streams respectively carrying first and second information. A source such as a laser produces a hyper-entangled photon stream that is entangled with respect to time, wavelength and polarization.

A wavelength division multiplexer receives the hyper-entangled photon stream and operates to split the hyper-entangled photon stream on the basis of wavelength into a first entangled stream and a second entangled stream.

A rotational control unit is positioned to operate on the first entangled stream by altering its polarization based on first information to be encoded, thereby producing an altered first entangled stream.

A time delay control unit is positioned to operate on the second entangled stream by selectively introducing a time delay based on second information to be encoded, thereby producing an altered second entangled stream. This time delay produces what could be thought of as a classical encoding scheme, although the manner of achieving it is different. In essence the disclosed technology encodes in both quantum and classical parameters of the same photon streams.

The altered first entangled stream and the second entangled stream collectively exist in a quantum superposition state by virtue of their mutual polarization entanglement, wherein the altered first entangled stream and the second entangled stream respectively carry the first and second information.

In another embodiment, plural frequencies of entangled pairs can be encoded by routing the photon pairs at each frequency to a separate quantum probability encoder. This arrangement further increases information density by increasing the number of separately controllable parameters.

BRIEF DESCRIPTION OF THE DRAWINGS

The drawings described herein are for illustrative purposes only of selected embodiments and not all possible implementations. The particular choice of drawings is not intended to limit the scope of the present disclosure.

DETAILED DESCRIPTION

Some Quantum Mechanics Fundamentals

Figure 1:
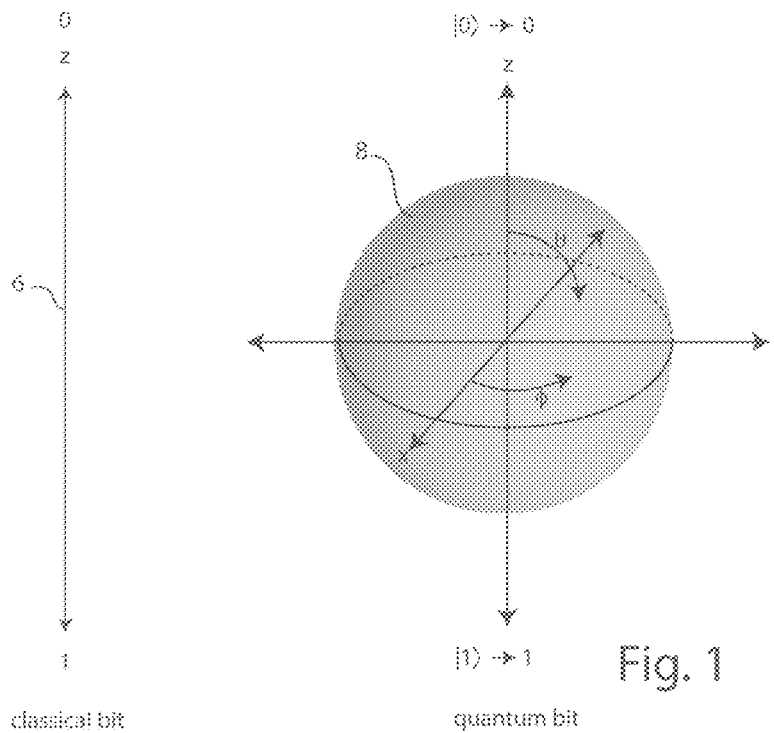
FIG. 1 is a graphical comparison of the classical binary digit (bit) with the quantum digits (qubits), using a Bloch sphere representation of different possible qubit states.

Quantum technology relies on manipulating quantum mechanical properties of suitable objects, typically subatomic particles. Essentially, meaning is ascribed to different quantum states. As will be explained, there is a considerable difference between the quantum world and the 1 and 0 binary logic of the classical world.

In the quantum world, the 1 and 0 binary logic of the classical world is retained, but the requirement that a state can be only 1 or 0 is abolished. In the quantum world, both states of 0 and 1 can exist at the same time. Thus the quantum state is a superposition of two classical states. Quantum digits are called qubits, to distinguish them from classical binary digits or bits. While the ability to store both states at the same time may seem counterintuitive, it its quite natural on the subatomic scale.

By way of example, envision a subatomic arrangement where a free electron finds itself simultaneously attracted to the nuclei of two like atoms A and B, as a consequence of having been positioned nearly equidistant to both. We might assign the binary state 1 when the electron is attracted to atom A, and the binary state 0 when the electron is attracted to atom B. However, following the forces of Nature, the electron will move to its lowest energy state, migrating to a position equidistant between atoms A and B. In such state, by our definition, the electron is in both binary states 1 and 0 at the same time. Any attempt to measure the electron's position will pull it in one direction or the other, and the 50-50 chance of being in both states vanishes. The measured outcome will be 1 or 0, depending on which way the electron moved when measurement was taken.

Qubits and Superposition

As noted above, classical digital communication systems represent information as binary digits or bits, which can store only the values 0 or 1. In the disclosed quantum communication system the classical bit is replaced by the quantum bit or qubit. Like the classical bit, a qubit can take two values 0 or 1, but unlike classical bits, the qubit can represent both values 0 and 1 at the same time. In this disclosure, to differentiate qubits from classical bits, qubit values have been represented using the bra-ket notation or Dirac notation, in which the 0 and 1 values are written between a vertical bar and an angle bracket, called a ket, as illustrated below:

|0⟩, |1⟩

To represent this notion of being in multiple states at the same time, physicists use a mathematical concept known as quantum superposition. Mathematically, the state of the qubit ψ can be written as:

$$|\psi\rangle = \alpha|0\rangle + \beta|1\rangle$$

In the above equation the probability of being in the |0⟩ state is a function of the amplitude factor α; the probability of being in the |1⟩ state is a function of the amplitude factor β. The probability values are determined by computing the normalized-square of the amplitude factors. The probability of measuring the |0⟩ state is $|\alpha|^2$, and the probability of measuring the |1⟩ state is $|\beta|^2$. Once measurement is performed, the qubit loses its superposition and continues to exist in its observed state as either 0 or 1.

Quantum superposition is a fundamental principle of quantum mechanics. It states that, much like waves in classical physics, any two quantum states can be added together, and the result will be another valid quantum state; and conversely, that every quantum state can be represented as a sum of two or more other distinct states.

Bloch Sphere

To get a sense of the quantum particle's ability to be in more than one state at a time, refer to FIG. 1, which compares the classical bit to the quantum qubit. The classical bit can exist in one of two states 0 or 1, as depicted at 6, where the two states are aligned with the opposite poles of the z-axis. In essence, the classical binary state is either up or down. There are no other choices possible.

By comparison, the quantum qubit can take on values |0⟩ and |1⟩ at opposite poles of the z-axis; but it can also take on vector values by circular rotation about the z-axis in the ϕ and θ directions to reach any point on the surface of the Bloch sphere 8 (an infinite number of points). Thus as FIG. 1 illustrates, the quantum qubit can simultaneously represent as many states as a quantum system can be designed to utilize. The classical qubit can only represent two states.

Measurement

As noted above, in its superposition state, the qubit represents all possible states permitted by the quantum mechanics governing the particle being exploited (in this case the photon). However, as soon as a measurement of the particle is taken, only one outcome resolves, based on the underlying probabilities governing the quantum superposition. Upon measurement, the superposition collapses. In effect, measurement collapses the qubit.

Some Properties of Photons

The photons the quantization of the electromagnetic field. Photons, and the associated electromagnetic waves, propagate in free space at the speed of light. Electromagnetic waves exist over spectrum of frequencies (related to the energy level according to Planck's law) which include radio waves and visible light. Electromagnetic waves embody orthogonally coupled electric and magnetic fields and exhibit a property known as polarization. Customarily, the direction of the electric field is taken as the polarization direction.

Quantum Properties of the Disclosed Communication System

Entanglement

The disclosed communication system uses a propagating stream of entangled photons. Specifically, pairs of entangled photons are generated, such that each entangled pair represents a quantum superposition state.

The quantum superposition state is then modulated to carry a message in the entangled photon stream. In the disclosed system, entangled photon pairs are altered in such a way that the probabilities associated with each possible polarization measurement outcome is predictably altered, thereby encoding a message within the quantum superposition state.

Successively generated pairs of entangled photons are propagated collectively to comprise a propagating photon stream (a propagating electromagnetic wave).

Parallelism

Quantum parallelism commonly refers to the ability of a quantum computer to evaluate a function for multiple input values simultaneously. This can be achieved by preparing a quantum system in a superposition of input states and applying a unitary transformation that encodes the function to be evaluated. Thus, this unitary operator acts on the entire quantum superposition state. The resulting state encodes the function's output values for all input values in the superposition, allowing for the computation of multiple outputs simultaneously. This property is key to the speedup of many quantum algorithms.

In the disclosed quantum communication system, quantum parallelism is exploited in a different way. Quantum parallelism is embodied in the stream of entangled pairs of photons, which comprise a propagating photon stream and propagating electromagnetic wave. The quantum superposition state is encoded through operation of a rotational control unit, which alters the polarization state of the entangled pairs to modulate the propagating photon stream and electromagnetic wave with a quantum message. This quantum message travels with the propagating photon stream and electromagnetic wave. Although not required, the electromagnetic wave may also be classically modulated, using for example a pulse modulation scheme. Thus the disclosed quantum communication system can carry two entirely separate messages based on fundamentally different physical phenomena—the difference being one message uses classical binary representation whereas the other message uses a quantum representation. The classical encoding scheme uses time delay encoding, whereas the quantum encoding scheme uses polarization encoding.

Interference—A Fundamental Difference

In classical communication systems, information conveyed as binary digits is purely logical. The bits are simply values used to represent the message being communicated, and the underlying physics of how these values are stored is irrelevant.

In the disclosed quantum communication system, information is conveyed using qubits. Qubits exhibit a behavior known as interference that sets them apart from classical binary digits. By their very nature, qubits are tied to the underlying quantum physics governing the physical particles that embody the quantum system. The quantum particles interact with each other on a quantum level, and that interaction changes the probabilities of a qubit being in a certain state.

In the disclosed quantum communication system, the qubits are embodied as photons, and those photons exhibit constructive and destructive interference, which alter the α and β amplitudes associated with being in the |0⟩ and |1⟩ states. Specifically, the half-wave plate of the optical circuit is used to place one of the two photons from an entangled pair into a single photon superposition state. Mathematically, this causes the polarization state coefficients (α and β) to change through addition and subtraction, which leads to changes in the probabilities of observable states. In this regard, it bears mention that both photons in an entangled pair are propagated together along the propagation path from source to destination. This differs from other distributed entanglement systems where one photon of an entangled pair is transmitted to a destination, while the other photon of the entangled pair is retained at the source—the so-called Bob and Alice scenario. In such "holding" scenarios, quantum memory devices are typically needed.

System Overview

The disclosed communication system encodes information upon an entangled photon stream, using an optical quantum circuit comprising a rotational control unit, a time delay control unit and optionally other devices which place the information in the entangled photon stream. The optical quantum circuit may be used to implement a variety of different communication system components, including an improved quantum relay and an improved quantum signal source.

Figure 7:
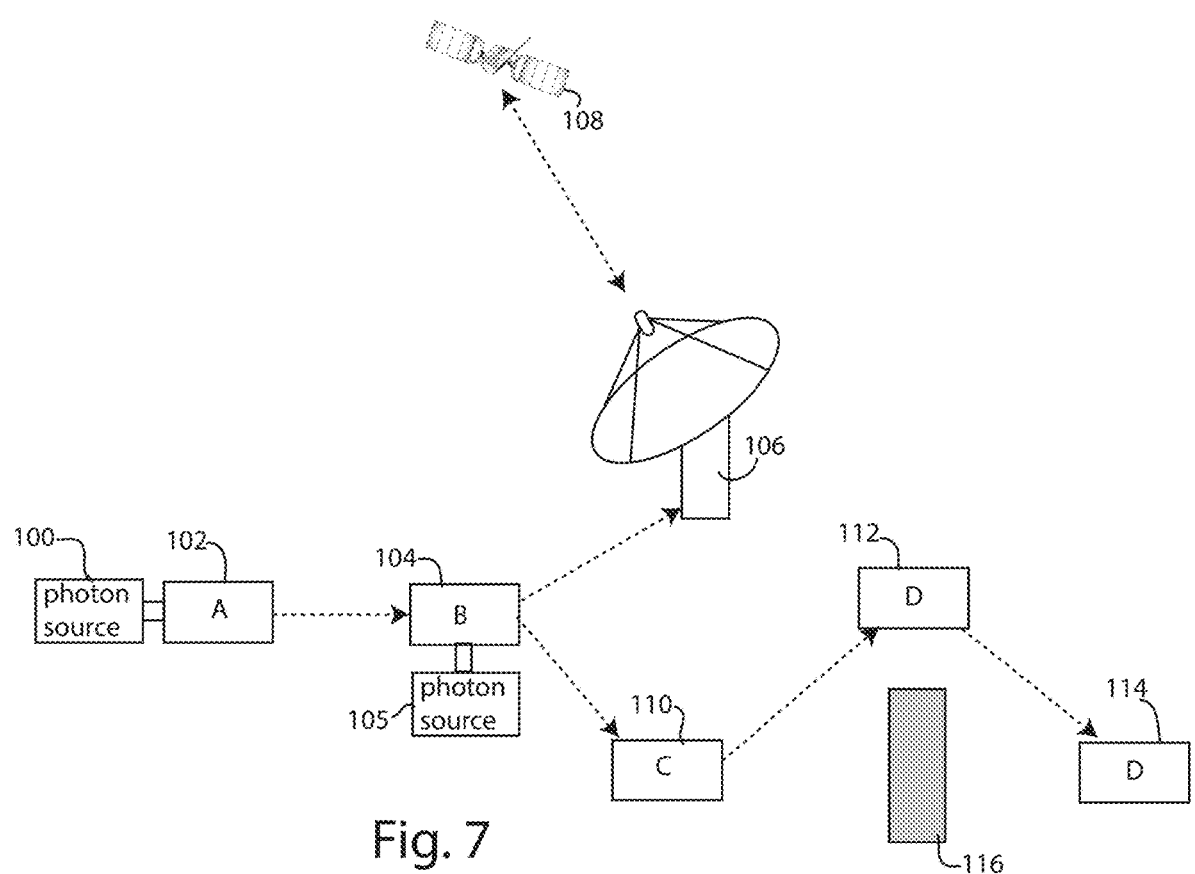
FIG. 7 is an exemplary quantum communication system, illustrating use of repeaters and relays.

By way of simple illustration, FIG. 7 shows a quantum communication system according to the techniques described herein. An initial photon source device 100 provides a continuous stream of entangled photons which are supplied to a first optical quantum circuit 102. Optical quantum circuit 102 encodes a first message on the entangled stream by manipulating polarization, as will be more fully described below. The photon stream with first message encoded is then transmitted from A to B, where it is received by a second optical quantum circuit 104. functioning as a quantum repeater. Acting as a repeater, receives the incoming signal, extracts the information from that signal, and then generates a new signal with the same information to overcome the power loss up to that point in the chain. The second optical quantum circuit 104 uses its own photon source 105, the output of which it encodes with quantum information to generate the new signal. As used herein the term "quantum relay" refers to a device which receives an incoming signal, has the ability to encode additional information onto the received signal, and then redirects the signal to another node.

The new signal from optical quantum circuit 104 may be split and fed to a satellite repeater base station 106 in communication with satellite 108 and also to a third optical quantum circuit 110 operating as a quantum relay. Acting as a quantum relay, the third optical quantum circuit 110 routes the signal around interfering obstacle 116 by directing the photon stream to optical quantum circuit 112, which in turn relays the photon stream to the destination node implemented by optical quantum circuit 114. Circuit 114 may be configured with detectors to read the message carried by the relayed signal.

The optical quantum circuits operating as relays in the above example do not require their own photon sources, as they are operating upon the received photon stream without reading or extracting the quantum encoded information carried by the received stream. If desired, as explained below, the optical quantum circuits operating as relays can place additional information on the photon stream by further manipulating the polarization.

Before discussing these quantum circuits in detail, it will be helpful to understand several building-block components which these circuits utilize to add information to the entangled photon stream by manipulating the quantum probability distribution of the entangled stream's quantum superposition state. A discussion of these building-block components is provided next, with reference to FIGS. 2-6.

Figure 2:
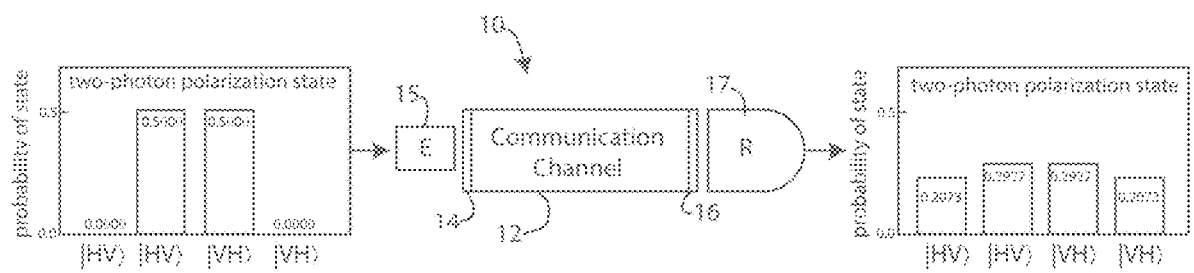
FIG. 2 is a block diagram of a communication system using the optical quantum circuit.

With reference to FIG. 2 the communication system 10 implements at least one communication channel 12 that is configured to carry a continuous stream of photons. The channel 12 includes an input node 14 to which an encoder 15 is coupled, and an output node 16 to which a receiver 17 is coupled. The input and output nodes may be coupled by a suitable waveguide, such as an optical cable, or the input and output nodes may be coupled by free space propagation between suitable antennas at the respective input and output nodes. In both guided wave and free space propagation embodiments, the continuous stream of photons collectively behave as a radiating electromagnetic wave which may be classically described by Maxwell's equations.

The stream of photons and the radiating electromagnetic wave which they embody differ from a classical electromagnetic radio wave or optical wave. In the disclosed system at least a portion of the photons in the stream are entangled quantum mechanically and the superposition of those entangled photons are encoded by encoder 15 to carry information that has been expressed by explicit modification of the quantum probability states of the entangled photons.

Entangled Photon Source

The quantum communication system relies on a source of entangled photons. In a typical system these entangled photons will be generated by an initial photon source device, the output of which is encoded with quantum information by a first optical quantum circuit, and then transmitted to subsequent nodes, including relays and repeaters. Relays simply redirect the signal received and thus typically do not require a local photon source. Repeaters extract information from the signal received, and then generates a new signal. Thus, repeaters will typically require a local photon source.

Figure 3A:
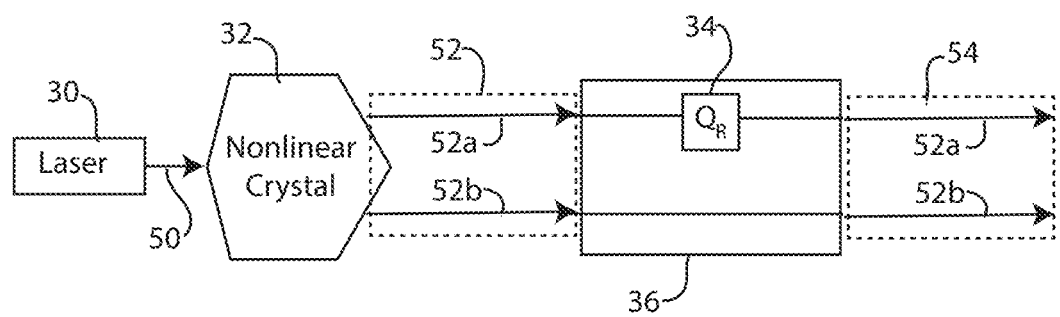
FIG. 3A is a diagram showing how a laser and non-linear crystal serve as an optical source for producing the entangled photon streams, which may then be fed to the quantum probability encoder.
Figure 3B:
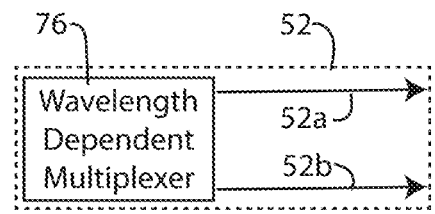
FIG. 3B is a block diagram illustrating a wavelength dependent multiplexer that may be substituted for the laser and non-linear crystal of FIG. 3A when operating upon hyper-entangled photon from an upstream optical source (not shown)

In one embodiment the entangled photon source may be implemented by the optics system illustrated in FIG. 3. A stream of photons 50 is produced by laser 30 at a predetermined pump signal frequency and fed through a nonlinear optical medium, such as a nonlinear crystal 32. The nonlinear crystal may be implemented using, for example, lithium niobate, potassium diphosphate (KDP), or barium borate or beta-barium borate crystal. Other materials are also suitable. The crystal splits the photon stream 50 into two streams of entangled photons, shown collectively at 52. These two streams satisfy the conservation of energy and conservation of momentum principles, such that the combined energy and momenta of the two streams are equal to the energy and momentum of the laser pump signal. The two output streams are down-conversions of the pump signal; both output streams are lower in frequency than the pump signal frequency.

The process described above produces time-frequency entangled photons which are also correlated in polarization. In some instances the source of hyper-entangled photons may originate from an upstream optical source (not implemented as part of the quantum probability encoder unit). FIG. 3A illustrates wavelength dependent multiplexer (WDM) 76 which can be inserted in the circuit of FIG. 3 in place of the laser 30 and non-linear crystal 32. The WDM 76 receives the hyper-entangled photons from an upstream source (not shown). The incoming hyper-entangled photons are entangled across more than one parameter (time-frequency and polarization in this case). The wavelength dependent multiplexer (WDM) is used to spatially separate the entangled pair along the two paths in box 52 of FIG. 3A. This would break the time-frequency entanglement at that point, which presents no problem since the polarization entanglement is maintained.

Optical Quantum Circuit and Rotational Control Unit

The output streams may be propagated through separate waveguides (e.g. fiber optic cables) so that one of the streams (stream 52a) is directed through a rotational control unit 34 while the other stream (stream 52b) is not. The rotational control unit 34 selectively imparts a polarization-encoded (via changes in the observable quantum polarization state probabilities) message stream 52a, such that the entangled streams, downstream of the rotational control unit as at 54, now carry a quantum-encoded message. Collectively the two waveguides and rotational control unit comprise the optical quantum circuit 36.

The rotational control unit 34 may be provided with an externally applied control signal at 68 which establishes the quantum rotational effect of the control unit 34 upon the stream fed through that leg of the optical quantum circuit. The effect of the optical quantum circuit is to alter the relative quantum phase of the superposition state of the entangled photon streams flowing through the two waveguides. In this sense the optical quantum circuit acts as an encoder which places information (supplied by the control signal 68) into the quantum superposition state of the entangled photon streams.

Figure 4:
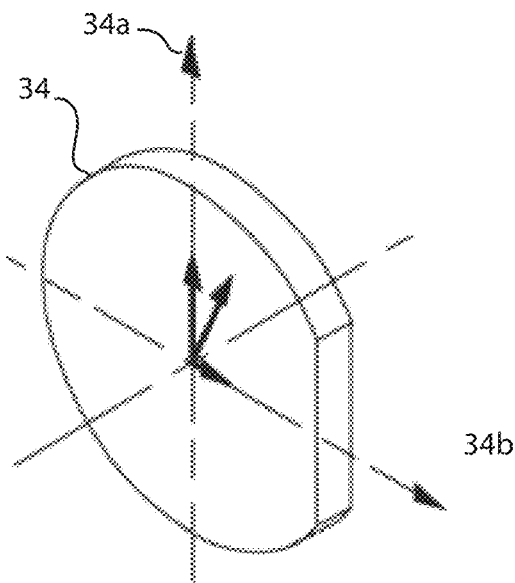
FIG. 4 is a diagram of an exemplary a half-wave plate used by the rotational control unit.

The rotational control unit 34 in its basic form may be implemented using a half-waveplate structure, an example of which is illustrated in FIG. 4. The half-waveplate structure is constructed of birefringent materials acting as a wave retarder that selectively alters the propagation velocity of light passing through. The structure defines a fast axis 34a and a slow axis 34b. Light passing through the fast axis travels more quickly than light passing through the slow axis, imparting a 90-degree change in polarization.

The rotational control unit may be electrically controlled in several ways. In one embodiment, an electrically controlled optical switch directs the photon stream either through a suitably positioned half-waveplate structure, or around it, to modulate the polarization of the photon stream in accordance with the encoded message.

Figure 5:
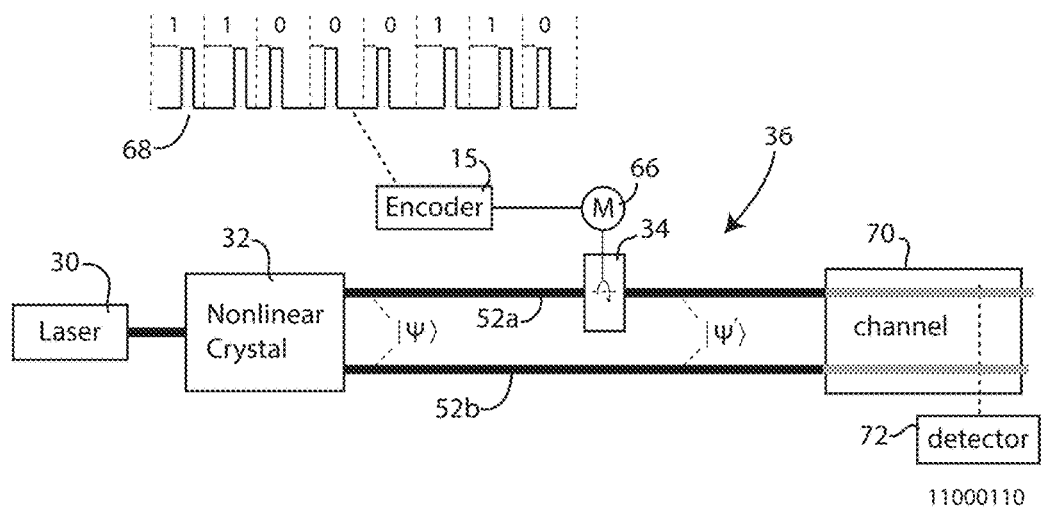
FIG. 5 is a diagram illustrating how an electromechanical system can be used to control the half-waveplate.

In another embodiment, shown in FIG. 5, the half-waveplate is rotated about its axis by a motor 66 or other electro-mechanical system controlled through a software encoder 15 that encodes the probability distribution of the photons by changing the angle of the half-waveplate fast axis relative to the incident photon polarization axis. So, the incoming photons simply pass through the half-wave plate while the separate control unit changes the angle of the half-wave plate as a function of time. The software encoder 15, motorized electromechanical system 66 and half-waveplate thus define the operative components of the optical quantum circuit 36.

To place a quantum-encoded message into the photon stream, the message may be encoded as a series of control pulses using a suitable encoding scheme which is mapped to certain probability distributions of the measured states. By way of example, pulse-position modulation may be used. Of course, other modulation schemes may also be used.

Such an exemplary modulation signal is illustrated at 68. The illustrated modulation signal is a pulse-position modulated signal, using a first pulse position to represent a binary 1 and a second pulse position to represent a binary 0. The pulse positions are located relative to a fixed clock signal or timing signal, shown in dotted lines. The exemplary modulation signal represents a message payload comprising binary digits 11000110. It will be understood that this is merely an exemplary message for illustration purposes. Pulse-position modulated (PPM) and similar schemes may often use bit mapping schemes as well. For example, a pulse (or some signal) in a specific time slot maps to a long string of bits. Such schemes may be used in the disclosed system.

The modulation signal thus selectively imparts a polarization variation in photon stream 52a, which in turn modulates probability distribution of the polarization state of the entangled pair of photon streams. As illustrated in FIG. 5, the polarization-entangled photons exiting the nonlinear crystal 32 have superposition state vector $|\psi\rangle$. However after exiting the rotational control unit 34, the polarization-entangled pair have an altered superposition state vector $|\psi'\rangle$.

Reading the Quantum Encoded Message

The output of the optical quantum circuit may then be suitably fed to a destination node where the encoded quantum superposition state may be read using a suitable detector. In FIG. 5 the output of the optical quantum circuit 36 travels through a communication channel 70, at the end of which is located detector 72. Detector 72 reads the polarization state of the entangled photon stream(s) to retrieve the quantum encoded message. This act of reading collapses the entanglement, as discussed above.

Detection may be accomplished at 72 in different ways. A continuous detection scheme (e.g., using an optical parametric amplifier) may be used; or a discrete detection scheme (such as a pair of single photon detectors) may be used (see details below).

Continuous scheme: An optical parametric amplifier (OPA) is used as an interference-based amplifier that uses difference frequency generation via a spontaneous parametric down conversation (SPDC) process. The OPA has both phase and polarization requirements for amplification. So, by changing the probabilities of entangled photon states such that identical polarization states (e.g. HH or VV) are more favored or less favored, the amplification of the output signal may be changed by a controllable amount. Effectively, this sets an upper bound on the amplification. Within that upper bound, other classical encoding schemes such as phase modulation may be employed.

Discrete Scheme: This scheme uses two single photon detectors, a delay line in one of the channels, time-tagging hardware, and a polarization-based beam splitter. The time of arrival for all of the photons may be recorded via the time-tagging hardware. Once all of the time of arrival data are received, the four potential states may be differentiated by using cross-correlation and auto-correlations. Cross-correlations can give the total number of HV and VH pairs. This looks like a peak in the cross-correlation plot that corresponds to a time offset equal to the channel delay time added previously. For the HH and VV states, the auto-correlation can be used in the same way to determine the total number of events for each state, with the delay line being used to identify photon 1 vs photon 2.

Because the entangled photon stream(s) are arriving in a continuous fashion, detection may be performed by looking at the data received at the detector in time bins to determine the total probability distribution for the measured photons in that bin. The results of such analysis may then be mapped to a set of classical bits corresponding to those produced by the encoder 15.

The quantum encoded message enjoys a security or anti-tampering benefit not found in classical systems. Reading the encoded quantum superposition state at the detector will collapse the superposition state. Thus, any attempt to read the entangled superposition state downstream of the detection event will be unsuccessful, as the superposition state no longer exists. This should hold true no matter what since the photons have been destroyed by the detector. If the quantum encoded message arrives at its intended destination, with the superposition state having already been collapsed, the recipient knows that the message has been intercepted prior to intended delivery. Specifically, the probability distribution would appear to be affected by more noise than what should be present in the communication channel. To the polarization entangled photons. interactions with the external environment are noise. This leads to depolarization of the photon pairs, which pushes the probability distribution of the observables to a flat distribution.

For a deeper understanding of how information may be encoded in the stream of polarization entangled photons, see the following half-waveplate derivation.

Half-Waveplate Derivation

For a pair of polarization entangled photons, the state vector in the linear polarization basis may be written as $$|\psi\rangle = \frac{1}{\sqrt{2}}(|HV\rangle + |VH\rangle) \quad \text{(Eq. 1)}$$

Passing one of the photons from the entangled pair through a linear optical device such as a half-waveplate, the superposition state will be altered due to quantum parallelism. A single photon passing through a half-waveplate will result in the following polarization dependent changes.

$$|H\rangle \rightarrow cos2\theta|H\rangle + sin2\theta|V\rangle \quad \text{(Eq. 2)}$$

$$|V\rangle \rightarrow sin2\theta|H\rangle - cos2\theta|V\rangle \quad \text{(Eq. 3)}$$

Where θ is the angle between the fast axis of the half-waveplate and the incident photon polarization. If the entangled photons are spatially separated and photon one from equation 1 is passed through a half-waveplate, then the new state vector is $$|\psi'\rangle = \frac{1}{\sqrt{2}}[(cos2\theta|H\rangle + sin2\theta|V\rangle)|V\rangle + (sin2\theta|H\rangle - cos2\theta|V\rangle)|H\rangle] \quad \text{(Eq. 4)}$$

Which simplifies to $$|\psi'\rangle = \frac{1}{\sqrt{2}}[cos2\theta(|HV\rangle - |VH\rangle) + sin2\theta(|VV\rangle + |HH\rangle)] \quad \text{(Eq. 5)}$$

As equation 5 shows, the result of one half-waveplate is the ability to move two pairs of possible observable states. The addition of a half-waveplate in the path of photon two, results in a different equation with the same properties as equation 5.

Adding Classical Modulation

If desired, the entangled photon stream, carrying information imparted by the operation of optical quantum circuit 36 with rotational control unit 34, can also be classically modulated to carry additional information. The continuous stream of photons flowing through the optical quantum circuit travels by guided wave or free space propagation in accordance with Maxwell's equations, as one or more electromagnetic waves at the frequency or frequencies produced by the laser pump and nonlinear crystal device.

Figure 6:
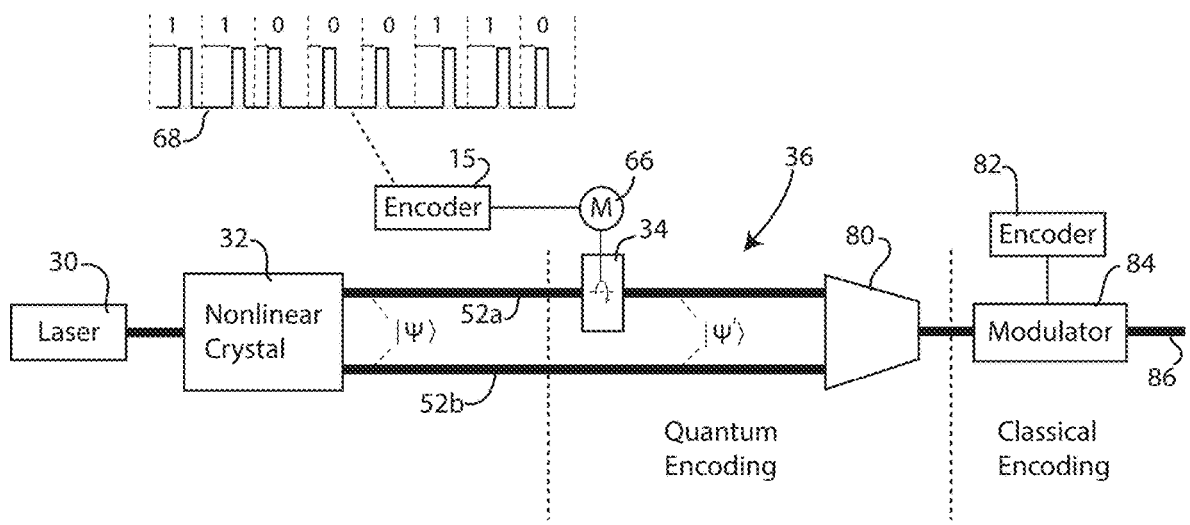
FIG. 6 is a diagram illustrating how a classical modulator may be added to the circuit of FIG. 5.

Thus, these electromagnetic waves can serve as a carrier and may be modulated using classical modulation techniques which do not alter the polarization in a way that would collapse the quantum entanglement used to encode the quantum message. Such a system is shown in FIG. 6. In FIG. 6, the circuit of FIG. 5 has been augmented to add a combiner 80 so that the entangled photons from the quantum encoding system may be fed through a classical modulator 84, driven by a suitable software encoder 82. The photons remain in their entangled state. Classical modulation can be implemented, for example by on-off continuous wave modulation (CW) or by other pulse modulation techniques, as these do not affect the polarization entanglement established by the nonlinear crystal 32. In FIG. 6, vertical dotted lines have been included to separate the quantum encoding portion from the classical encoding portion.

Quantum Relay Circuit

Figure 8:
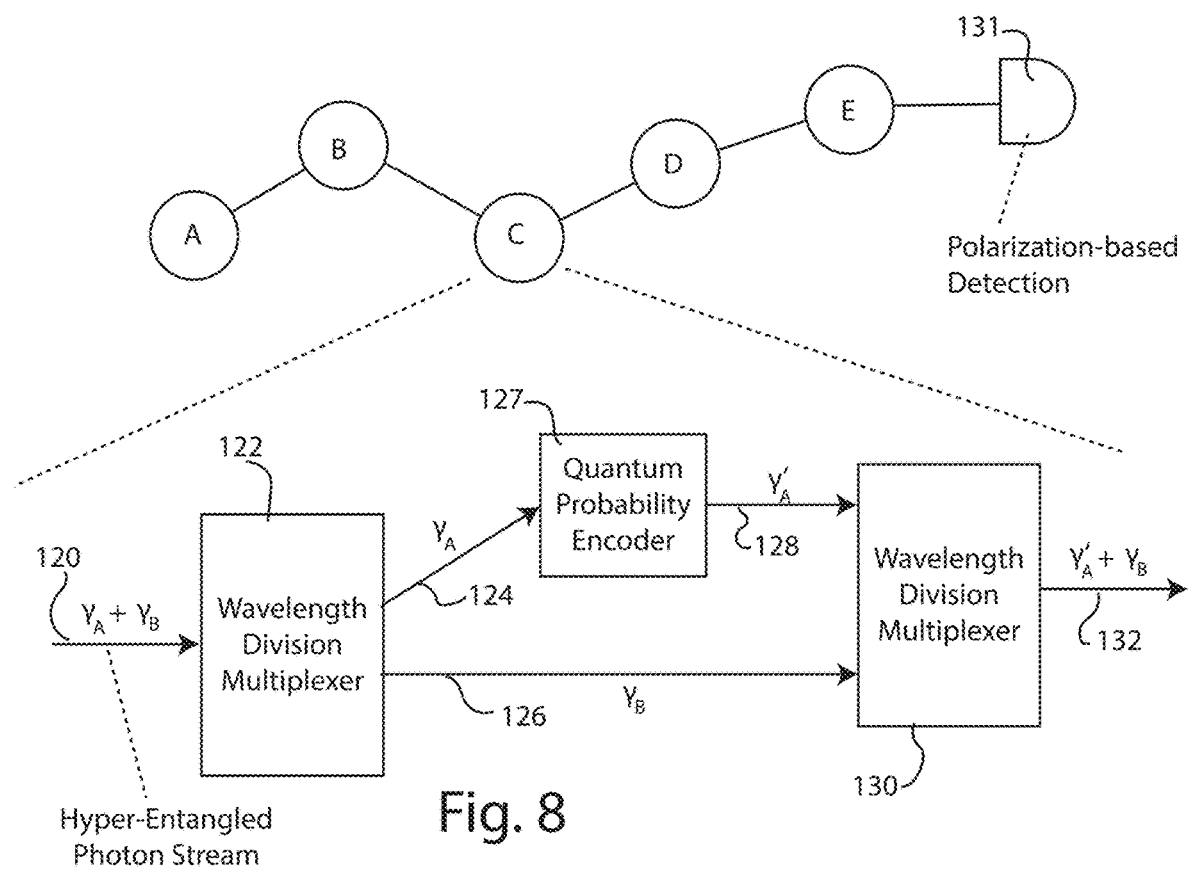
FIG. 8 illustrates a quantum relay system and details on how the relay device is implemented.

A series of quantum relays (according to the present disclosure) is shown in FIG. 8. FIG. 8 depicts an exemplary chain of relays, designated A through E. A polarization-based detector 131 reads the quantum-encoded message after it has been relayed to relay node E. The details of how exemplary relay C is constructed are provided in FIG. 8. The construction of the other relays would be the same.

A stream of incoming hyper-entangled photons ($\gamma_A + \gamma_A$), as at 120, is fed to a wavelength division multiplexer 122, which separates the stream into two streams 124 and 126 on the basis of frequency (wavelength). Stream 124 is fed to the quantum probability encoder 127, which encodes a quantum message by manipulating the polarization to produce the manipulated stream 128. The manipulated stream 128 is fed to a second wavelength division multiplexer 130, as shown. Meanwhile, stream 126 is fed directly as a second input to wavelength division multiplexer 130. Notably, stream 126 is not manipulated by the quantum probability encoder. The second wavelength division multiplexer 130 thus operates as a stream combiner, taking two streams 126 and 128 as inputs and providing a single combined stream 132 as output. The quantum message is carried by the probability state of the entangled photon stream ($\gamma_B + \gamma_A$).

As described above, the quantum message is encoded through manipulation of the polarization of stream 124. In this embodiment, the input stream at 120 has been characterized as hyper-entangled, meaning that it may also be entangled with respect to multiple properties, in this case as with respect to time and energy (wavelength or frequency). Passing through wavelength division multiplexer 122 has no effect on the polarization entanglement of the two streams 124 and 126.

When the streams 126 and 128 are recombined in wavelength division multiplexer 130, they become effectively co-propagating, such that the photons in each entangled pair comprising co-propagating stream 132, are still at different frequencies. At this point, the entangled pairs of photons in stream 132 can be transmitted to a second relay device, configured as illustrated in FIG. 8, and such second relay device will re-separate the pairs based on frequency, encode additional quantum information by applying further polarization manipulation, if desired, and send the pairs along to the next node.

So long as the polarization state of the entangled pairs are not read or measured, the quantum encoded signal can be relayed from one node to the next, so long as the relayed signal remains of measurable strength. Advantageously, the quantum process by which polarization is manipulated is reversible—prior polarization encoding information is not lost by subsequent polarization encoding. Thus, when the entanglement state is read at the terminal node, all of the quantum messages placed on the entangled pairs of photons can be ascertained.

Link Identification Signature

This ability to ascertain all of the messages added en route may be used, for example, to track the route the message took. Each repeater node adds it's unique signature to the quantum message, and those signatures can be decoded at the terminal node to determine through which nodes the message was relayed. In a hybrid system, the photon stream may also be carrying a classically encoded payload message. Thus the payload message can be delivered through classical communication means, while the relay route information is delivered using a fundamentally different, quantum communication means subject to different physical laws. Exploiting this fundamental difference between classical and quantum communication, a communication system constructed using the disclosed quantum relays can reveal if a delivered classical payload has been intercepted or tampered with en route.

To illustrate with reference to FIG. 8, assume that a classical message payload is being relayed to E through locations B to D, where each node B, C, D adds its own unique quantum signature by manipulating the entangled polarization state. If the message delivered at E carries the combined signatures of B-C-D, that signature indicates the message traveled to the destination by the B-C-D route. If, however, the message is delivered at E, carrying no quantum signature at all, that indicates that the entangled state was read and the entanglement was destroyed at some point prior to delivery at E. Additionally, if an eavesdropper intercepted the signal and was able to recreate the signal with entangled photons, the eavesdropper would need to be able to make it also look like it had traveled through the expected route and arrive with the correct power levels.

High Data rate Quantum Signal Source

In the preceding embodiments, information was quantum encoded by exploiting the polarization parameter of entangled photons. To achieve a higher information density (higher data rate), the signal source of FIG. 9 may be used. This signal source is capable of sending two different messages (or different portions of a compound message) in the entangled photon stream.

The quantum signal source employs an optical source such as a hyper-entangled photon source 140, which has been configured to produce photons at two different wavelengths. The photon stream from laser 140 is fed to wavelength division multiplexer 142, which splits the incoming photon stream into two streams 143 ($\gamma_1$, $\gamma_2$) on the basis of wavelength. These two streams are spatially separated and hyper-entangled with respect to polarization, time and energy.

One of the two streams is fed to an optical quantum rotation device 146, which is electrically controlled by a rotational control unit 148. The rotational control unit controls the rotation device to modulate the polarization of the first stream to carry first information content. The rotational control unit and optical quantum rotation device may be implemented as described above in connection with FIG. 3. The rotation device 146 and control unit 148 thus encode the photon stream by changing the polarization parameter of the entangled photons.

The second one of the two streams is fed to an optical delay device 150, which is electrically controlled by a delay control unit 152. The control unit 152 controls the delay device 150 to modulate the photon delivery time of the second one of the two streams. By this time modulation, the second stream carries second information content.

The collective output streams 153 represent altered entangled photon streams which carry information in both the polarization parameter and the time parameter [$\gamma'_1(t)$, $\gamma_2(t+t')$]. The signals carried by this altered entangled photon stream can be extracted by using a polarizing beam splitter 154 to direct the streams to a pair of single photon detectors 156a and 156b. In this way the horizontally polarized photons are sent to detector 156a, while the vertically polarized photons are sent to detector 156b. Specifically, the photons will be directed based on their individual polarizations. Individual photons of one polarization will go to a specific detector, while photons of the opposite polarization will go to the opposite detector.

The quantum encoding results in the photons being directed to specific detectors via a polarization beam splitter, while the variable path length would change where the cross-correlation peak appears for the various two-photon polarization states.

Figure 10:
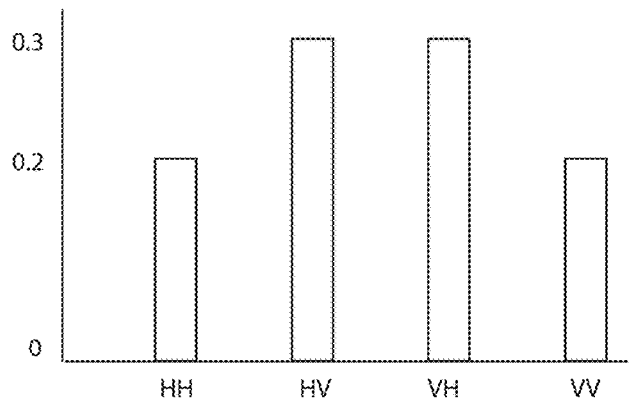
FIG. 10 is a graph depicting a two-photon state distribution of the four horizontal (H) and vertical (V) state combinations produced by the quantum signal source of FIG. 9.

A correlator device 160 operating as a streaming time-to-digital converter converts the detector outputs into digital data which can then analyzed as illustrated in FIG. 10. FIG. 10 graphically depicts the two-photon state distribution of the four horizontal (H) and vertical (V) state combinations. The totals of each state come from auto-correlation (AC) and cross-correlation (CC) calculations:

|HH⟩ → $AC_A$
|VV⟩ → $AC_B$
|HV⟩, |VH⟩ → CC

Figure 11:
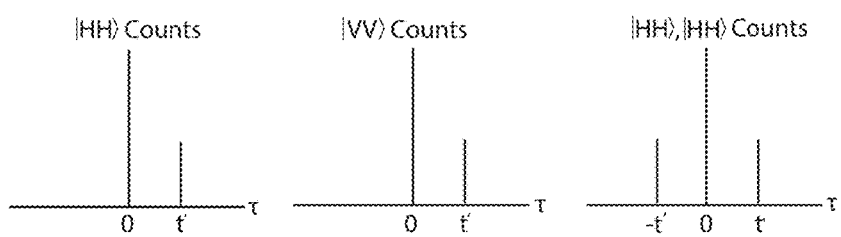
FIG. 11 depicts the cross-correlation peaks produced by the quantum signal source of FIG. 9, useful in understanding how encoding is implemented.

As shown in FIG. 11, the cross-correlation peaks depend on relative channel delay. Equidistant peaks in cross-correlation ensure measured photons are entangled. The distance between cross-correlation peaks ($\Delta\tau$) provides a parameter for encoding.

State Measurements

Delaying one photon of the entangled pair does not break the polarization entanglement. Placing the variable delay in the quantum probability encoding path, as in FIG. 9, as opposed to the detector path, allows for true randomness in which photon polarization experiences the delay. This is what yields the equidistant peaks in the cross-correlation.

In a working embodiment, the speed at which the correlation devices operate dictates whether real time processing can be achieved. In applications where real time processing is not required, slower correlation devices may be used in a receive-then-process format. In the disclosed embodiment bandwidth of the detectors and source are aligned in the optical domain.

Hybrid System Improves Classical Data Rate

Figure 9:
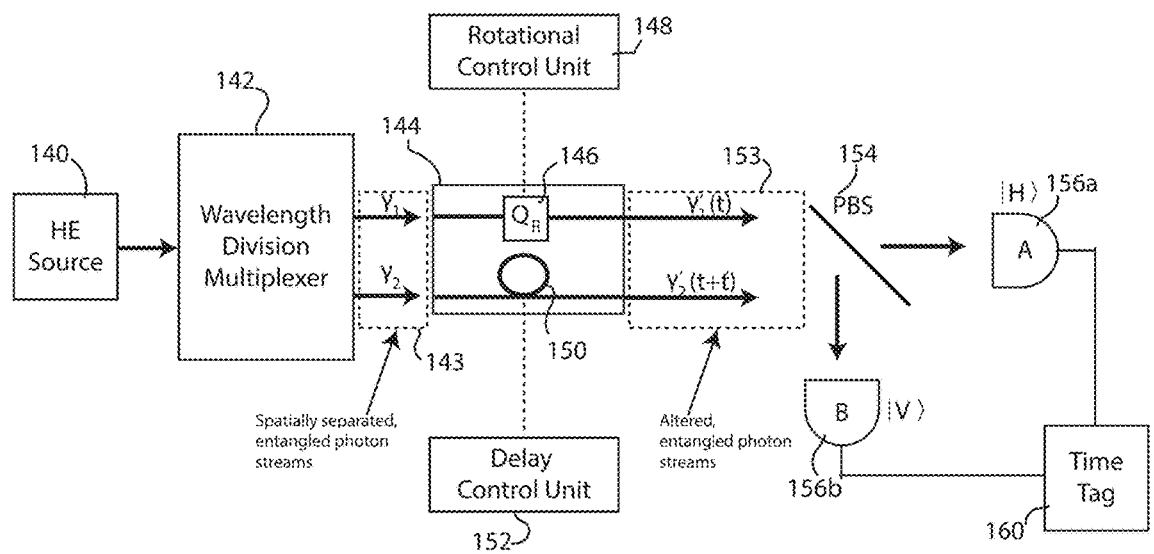
FIG. 9 illustrates a system including a quantum signal source embodiment which supports increased information density and a higher data rates.

The quantum signal source depicted in FIG. 9 has the ability achieve increased information density over what is possible in a purely classical system. In a classical system the information to be conveyed is typically encoded with respect to time, or a property related to time (e.g., frequency). Using the disclosed high data rate source allows classical information to be encoded in the time parameter, without destroying the additional information which is encoded in the polarization parameter.

Additional Parameters Also Possible

The embodiment of FIG. 9 can be modified to support even higher data density. The modification entails separating the wavelength division multiplexer (WDM) from the quantum probability encoder (QPE) unit as illustrated, allowing the modified embodiment to employ one source, one WDM, and then multiple QPE devices, supplying signals to multiple receivers. This allows the encoding of even more information into the same output of the source that was possible in the embodiment of FIG. 9.

To understand how this works, recognize that the embodiment of FIG. 9 picks out one set of entangled photon frequencies and essentially throws the rest away. However, in the modified embodiment, by routing all of the pairs output from the WDM into separate QPE devices, as in the modification discussed above, the system has a third parameter for encoding, namely the frequencies of the entangled pairs being detected. This means the modified embodiment has three parameters to use for encoding, allowing operations analogous to single-photon pulse position modulation (SP-PPM) using all of the unique permutations of the 3 parameters. This also holds equally true for 2 parameters, but there are less permutations to use.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. Various changes may be made in the function and arrangement of elements described in an exemplary embodiment without departing from the scope of the invention as set forth in the appended claims.

What is claimed is:

1. A quantum relay which exploits quantum properties to encode information in a received hyper-entangled photon stream which has been entangled with respect to wavelength (time-energy entanglement) and polarization, comprising:
a first wavelength division multiplexer receptive of the received hyper-entangled photon stream and operative to split the received hyper-entangled photon stream on the basis of wavelength into a first entangled stream and a second entangled stream;
a quantum probability encoder positioned to operate on the first entangled stream by altering its polarization based on information to be encoded, thereby producing an altered first entangled stream;
a second wavelength division multiplexer having a pair of inputs and an output;
the altered first entangled stream and the second entangled stream collectively existing in a quantum superposition state by virtue of their mutual polarization entanglement;
the altered first entangled stream and the second entangled stream being fed to the pair of inputs of the second wavelength division multiplexer;
the second wavelength division multiplexer combining the altered first entangled stream and the second entangled stream into an output stream supplied to the output of the second wavelength division multiplexer;
whereby the output stream carries encoded information in the quantum probability distributions of the quantum superposition state.

2. The quantum relay of claim 1 wherein the quantum probability encoder includes a half-waveplate that alters polarization of the first entangled stream based on a control signal.

3. The quantum relay of claim 1 further comprising a controller that converts the information to be conveyed into a series of impulses which are used to drive the quantum probability encoder.

4. The quantum relay of claim 3 wherein the controller employs pulse position modulation to develop the series of impulses.

5. The quantum relay of claim 2 wherein the half-waveplate includes an electro-mechanical system that rotates the half-waveplate based on the control signal.

6. The quantum relay of claim 1 further comprising a controller that generates node identification information fed to the quantum probability encoder to place an identification signature in the quantum probability distributions of the quantum superposition state.

7. The quantum relay of claim 1 wherein the received hyper-entangled photon stream carries an antecedent information quantum encoded in the probability distribution of the hyper-entangled photon stream and wherein the quantum probability encoder nondestructively adds the information to be encoded to the antecedent information.

8. The quantum relay of claim 1 wherein the altered first entangled stream oscillate with respect to a first wavelength and a second entangled stream oscillates with respect to a second wavelength; and
wherein the second wavelength division multiplexer combines the altered first entangled stream and the second entangled stream into an output stream of co-propagating photons oscillating with respect to the first and second wavelengths.

9. A quantum signal source for producing from a hyper-entangled photon stream entangled with respect to time, wavelength and polarization, a plurality of photon streams respectively carrying first and second information, comprising:
a wavelength division multiplexer receptive of the hyper-entangled photon stream and operative to split the hyper-entangled photon stream on the basis of wavelength into a first entangled stream and a second entangled stream;
a rotational control unit positioned to operate on the first entangled stream by altering its polarization based on first information to be encoded, thereby producing an altered first entangled stream;
a time delay control unit positioned to operate on the second entangled stream by selectively introducing a time delay based on second information to be encoded, thereby producing an altered second entangled stream;
the altered first entangled stream and the second entangled stream collectively existing in a quantum superposition state by virtue of their mutual polarization entanglement;
wherein the altered first entangled stream and the second entangled stream respectively carry the first and second information.

10. A communication system using the quantum signal source of claim 9 further comprising, polarizing beam splitter disposed in the path of the altered first entangled stream and the second entangled stream, operative to direct first individual photons of a first polarization to a first photon detector and operative to direct second individual photons of a second polarization to a second detector; and
a correlator coupled to the first and second photon detectors, the correlator producing at least one digital output from which the quantum superposition state can be ascertained.

11. The communication system of claim 9 wherein the rotational control unit includes a half-waveplate that alters polarization of the first entangled stream based on a control signal.

12. The quantum relay of claim 9 further comprising a first controller that converts the first information into a series of impulses which are used to drive the rotational control unit.

13. The quantum relay of claim 12 wherein the first controller employs pulse position modulation to develop the series of impulses.

14. The quantum relay of claim 11 wherein the half-waveplate includes an electro-mechanical system that rotates the half-waveplate based on the control signal.

15. The quantum relay of claim 9 further comprising a second controller that converts the second information into a series of impulses which are used to drive the rotational control unit.

* * * * *